Dec. 14, 1954 K. L. BURGENER 2,697,139

TESTING ARRANGEMENT FOR TELEPHONE LINES

Filed Feb. 8, 1951 4 Sheets-Sheet 1

INVENTOR.
KARL L. BURGENER

BY Chas. W. Cardy

ATTORNEY

Dec. 14, 1954 K. L. BURGENER 2,697,139

TESTING ARRANGEMENT FOR TELEPHONE LINES

Filed Feb. 8, 1951 4 Sheets-Sheet 2

*INVENTOR.*
KARL L. BURGENER
*BY* [signature]
ATTORNEY

INVENTOR.
KARL L. BURGENER
BY
ATTORNEY

Dec. 14, 1954 K. L. BURGENER 2,697,139

TESTING ARRANGEMENT FOR TELEPHONE LINES

Filed Feb. 8, 1951 4 Sheets-Sheet 4

INVENTOR.
KARL L. BURGENER

BY [signature]

ATTORNEY

United States Patent Office 2,697,139

Patented Dec. 14, 1954

2,697,139

TESTING ARRANGEMENT FOR TELEPHONE LINES

Karl L. Burgener, Villa Park, Ill., assignor to Automatic Electric Laboratories, Inc., Chicago, Ill., a corporation of Delaware Application February 8, 1951, Serial No. 210,031

10 Claims. (Cl. 179—175)

Figure 1:
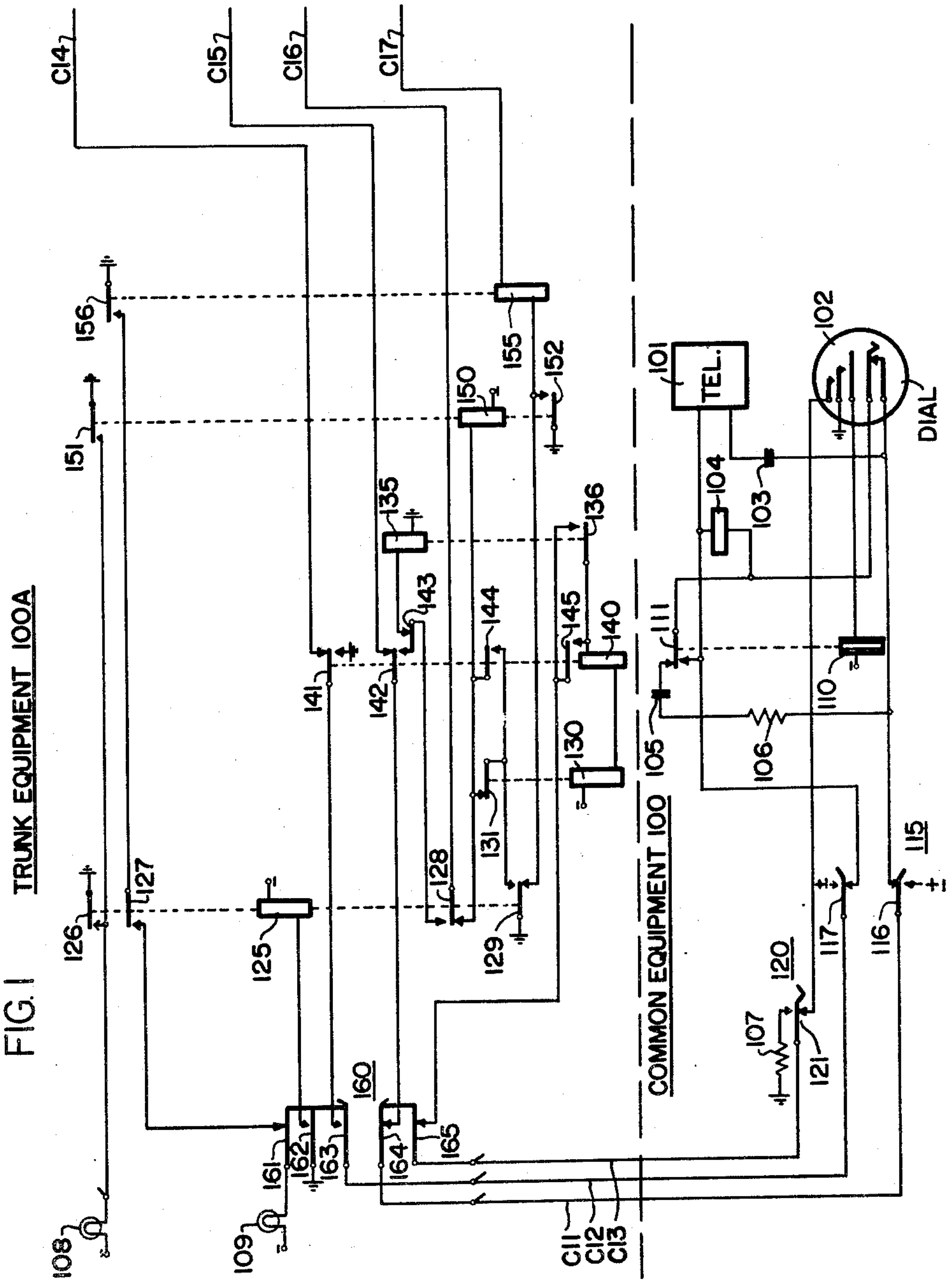

The present invention relates in general to improvements in telephone systems and more particularly to improved arrangements for testing telephone lines.

In order to facilitate the testing of the various lines which enter a telephone exchange it is usual to provide in the exchange a centralized test desk and automatic switching apparatus by means of which it is possible to extend a test circuit from the test desk directly to the conductors of any desired one of the lines. Facilities of this character ordinarily include some arrangement for clearing a line of attachments, i. e., for disconnecting from the line under test that part of the exchange equipment which is normally connected to the line conductors of such line and which, if permitted to remain connected thereto, would adversely affect the test.

While the arrangements which heretofore have been provided for clearing a line of attachments are quite satisfactory under most conditions encountered in practice they usually are totally ineffective in the presence of certain abnormal conditions. If, for example, a connection is extended from the test desk to a line at a time when a "permanent" condition exists upon that line due to its conductors accidentally having become bridged and/or grounded, the conventional arrangements will not disconnect the exchange equipment attached to the line conductors, and accordingly it is not possible to perform a satisfactory test upon the line over the connection extended thereto from the test desk.

Also, arrangements heretofore used for clearing a line of attachments have been satisfactory where the battery operating the attachments is connected in the normal manner. But should the attachments-battery be reversed the conventional arrangements will not disconnect the attachments.

Some arrangements have been used whereby a releasing battery is applied and will then be reversed if the attachments-battery is found reversed. These arrangements have been found unsatisfactory because of the resulting heavy current flow in the equipment when the releasing battery is applied to the equipment, released and reversed, and again applied to the equipment. Although generally the equipment can withstand the greater current flow, there is present the danger of excessive sparking at the contacts and/or a breakdown of the equipment.

The present invention is an improvement on the invention described in the application of Frank Kessler, Serial No. 778,486, filed October 7, 1947, and it is the general object of the present invention, therefore, to provide an improved arrangement for clearing a line of attachments.

The accidental bridging and/or grounding of a line simulates a calling condition and may be of such nature that it operates the line equipment and results in the extension of a connection from the line to switching equipment which is common to a group of lines. The faulty condition may be of such nature that it will not operate the line equipment but it will hold equipment common to a group of lines in case an attempt is made to extend a call to or from the faulty line. It is another object of the present invention to provide an improved arrangement for breaking down a connection thus extended or held.

It is another object of the present invention to test the connections of the exchange battery before applying battery to release the switching equipment.

It is another object of the present invention to release the switching equipment by applying battery to the switching equipment according to the results of a test.

An important feature of the invention is that the telephone system being tested will not be subject to high current surges during certain testing operations.

The foregoing objects and feature of the invention will be better understood and other objects and features will be apparent from the following detailed description of the invention, taken in conjunction with the accompanying drawing, comprising Figures 1 to 4 inclusive which forms a part thereof, showing the invention as applied to the well known Strowger Step by Step System. The arrangement for disconnecting switching equipment from telephone lines as shown in the application of Frank Kessler, Serial No. 778,486, filed October 7, 1947, will only be broadly described here, and reference is made to that application for a detailed description of that equipment. It will be understood, however, that the arrangement herein described is presented by way of example only, and various modifications may be made in the circuit details by those skilled in the art without departing from the spirit of the invention and that the invention can be applied to other systems.

Referring now to the drawing comprising Figures 1 to 4 inclusive Figure 1 shows diagrammatically part of the common equipment at a test desk and equipment connecting it to an individual test distributor.

Figure 2:
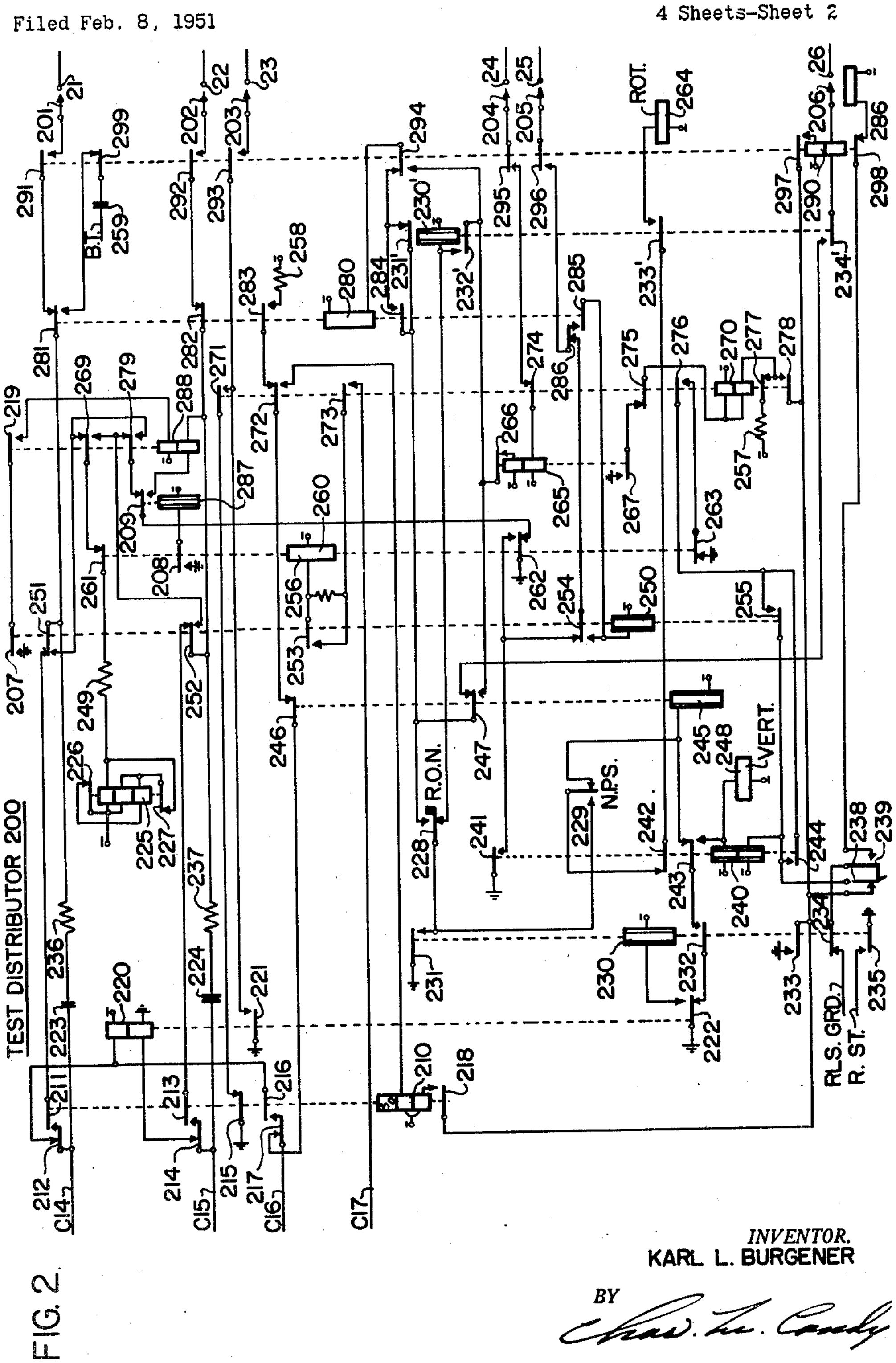
Figure 4:
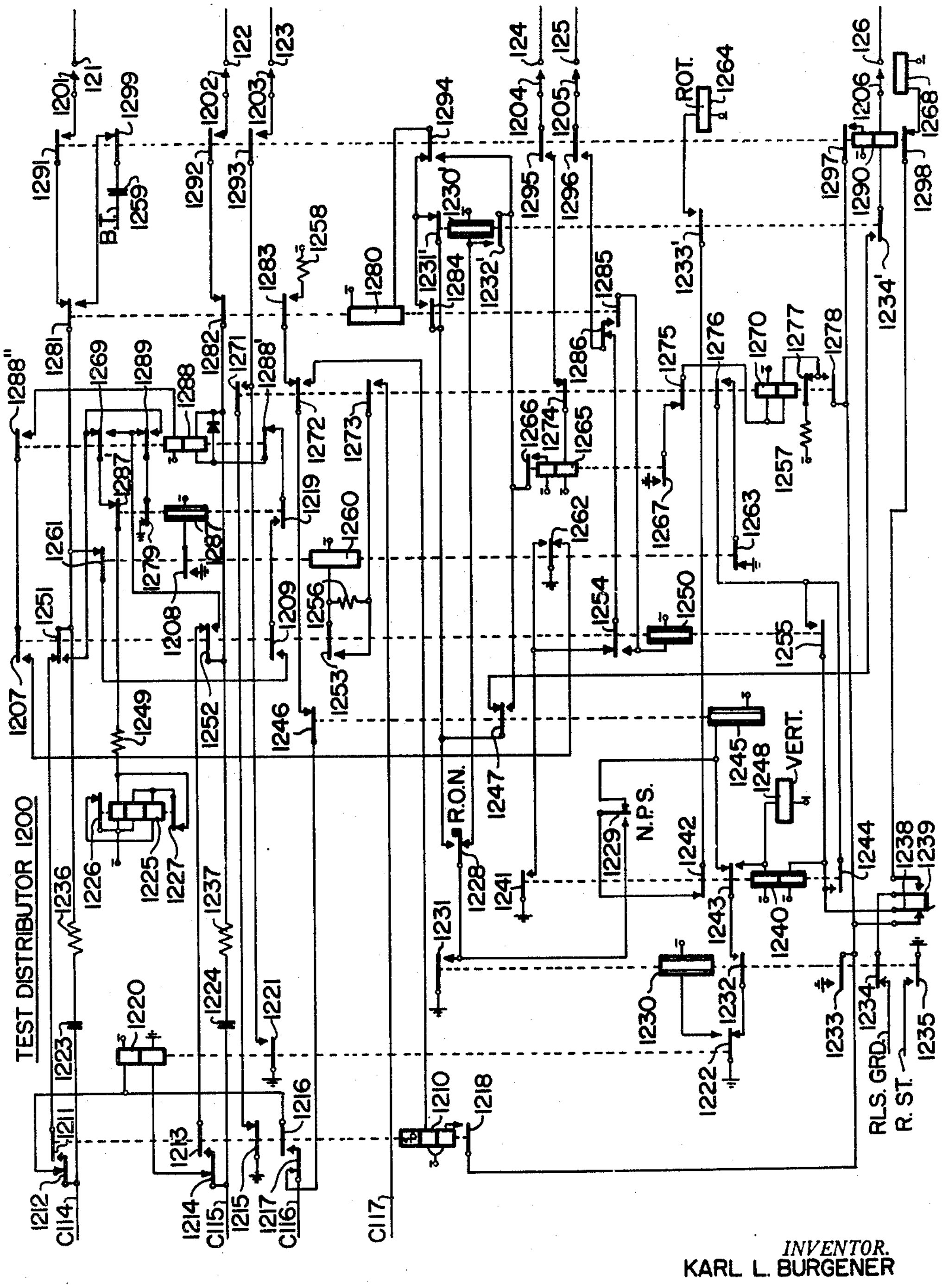

Figures 2 and 4 show two examples of a test distributor for use with the equipment in Figure 1.

Figure 3:
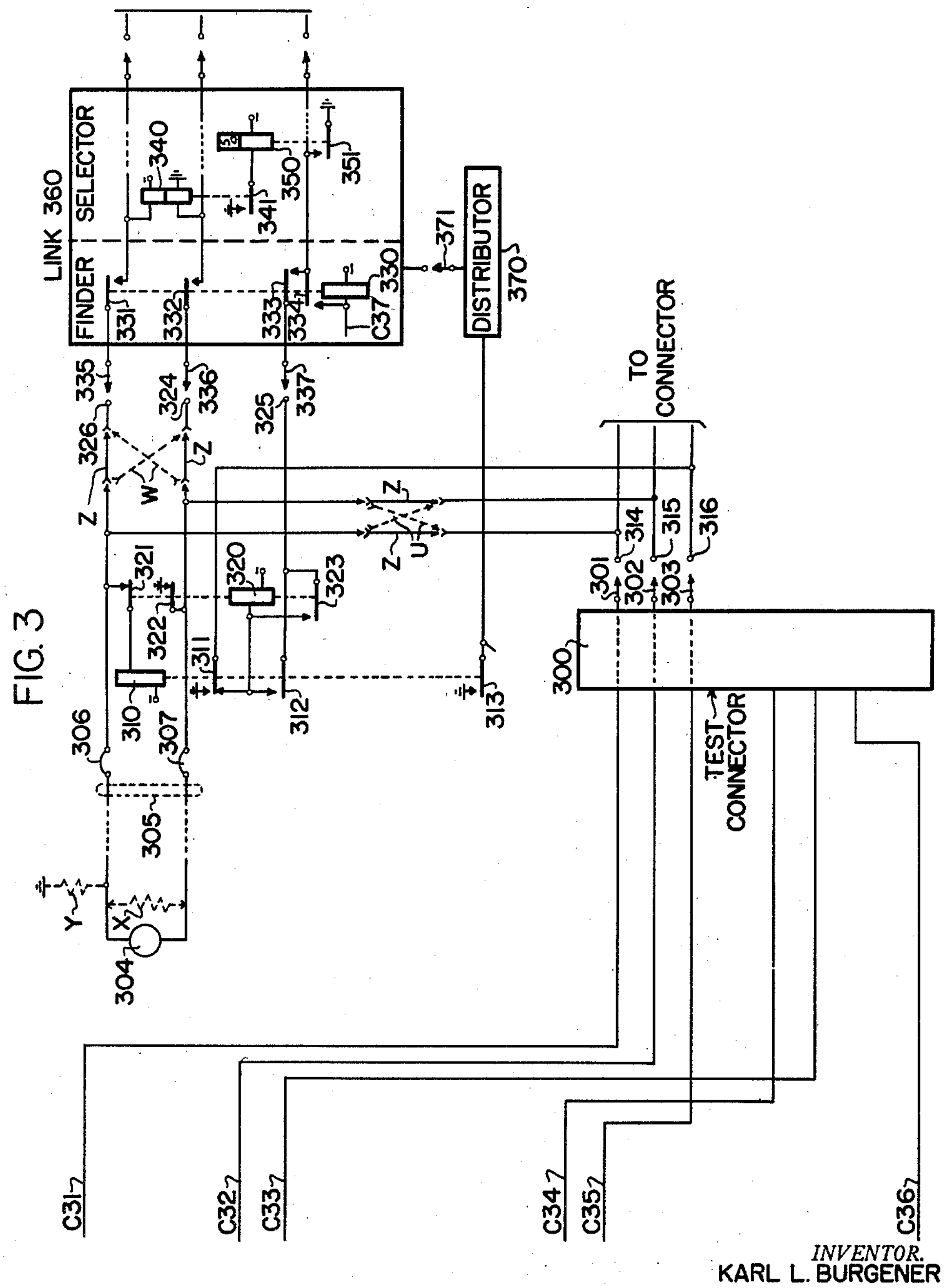

Figure 3 shows a test connector for operation with the test distributors of Figure 2 or Figure 4, a line and a circuit therefore, and a finder-selector link for use in extending connections from the line. Figure 3 also shows for an example, two situations in which attachments battery would test reversed as compared to the normal condition shown as Z. These two situations are shown in dotted lines as U and W.

The drawing is to be assembled with Figure 1 on the left, Figure 2 or 4 in the center and Figure 3 on the right.

The common equipment 100 shown in the lower portion of Figure 1 is arranged for connection to various trunk equipments on the test desk over the conductors C11, C12 and C13. The trunk equipment 100A shown in the upper portion of Figure 1 is individual to the test distributor shown in Figure 2 or Figure 4 and is connected thereto over the conductors C14 to C17 inclusive and is connected to the common equipment by the operation of the key 160.

The test distributors 200 or 1200 shown in Figure 2 or Figure 4 respectively are conventional two motion Strowger type switches arranged for connection to test connectors, such as test connector 300, by means of the wipers 201 to 206 inclusive or wipers 1201 to 1206 inclusive.

The test connector 300 in Figure 3 is one of a number of test connectors which terminate in the banks of the test distributors 200 or 1200.

The line 305 in Figure 3 is connected through the protecting equipment 306 and 307 to a line circuit comprising the line relay 310 and the cut-off relay 320. The conductors of the line 305 terminate in contacts 314, 315 and 316 in the bank of test connector 300 and are multipled to similar contacts in the regular subscriber controlled connectors (not shown) by means of which calls are extended to the various lines. The substation 304 associated with the line 305 may be any standard type equipped with the usual talking and signalling instrumentalities and with a calling device suitable for operating automatic switching equipment. The switching equipment includes links such as 360 which comprises a finder switch having access to calling lines and a selector switch having access to called lines over a train of one or more subsequent switches, depending on the number of lines in the system. Reference may be had to Patent No. 2,214,908, issued September 17, 1940, to C. E. Lomax et al., for additional details of one suitable form of finder-selector link.

The procedure for connecting the test desk through distributor 200 to the line 305 will now be broadly described.

The operation of the key 160, results in the operation of relay 125 which causes the lamp 108 to light and the relay 150 to operate. The operation of key 160 also results in the operation of relay 220. The operation of relay 220 results in the operation of relay 230. The operation of relay 230 results in the operation of relay 230' and also prepares the impulsing circuits to the stepping magnets and associated control relays at armature 231, and also at armature 234 disconnects RLS. GRD. from off normal spring 239, and at armature 235 grounds the RM. ST. lead to control associated common equipment, and also results in the operation of relay 240 through its lower winding.

The test distributor 200 may now be connected to the test connector 300 under control of the dial 102. When the dial 102 is moved off normal the relay 110 is operated short circuiting the inductance 104 to improve pulsing. As the dial 102 restores to normal the relay 220 follows the impulses and alternately closes and opens a circuit to the vertical magnet VERT. and the upper winding of relay 240. The vertical magnet VERT. moves the wipers 201 to 206 inclusive to the level in which the contacts 21 to 26 inclusive are located. The circuit to relay 230 is interrupted during impulsing but the relay 230 is slow to release and does not restore at this time. On the first operation of the vertical magnet VERT. the off normal spring 238 is opened, thus opening the circuit to the lower winding of the relay 240. The relay 240 is slow to release and is held operated by its upper winding energized in multiple with the vertical magnet VERT. After the dial restores to normal the relay 220 remains operated and the relay 240 releases preparing a circuit for the rotary magnet ROT. The relay 220 follows the impulses of the next digit alternately closing and opening a circuit to the rotary magnet ROT. The rotary magnet ROT. moves the wipers 201 to 206 inclusive into contact with the contacts 21 to 26 inclusive, and on its first operation operates the spring 228 thus opening the starting circuit to the relay 230' and preparing a circuit to the relay 280. Relay 245 operates on the first pulse and remains operated during pulsing due to its slow release feature. Relay 245 on operating closes a holding circuit for relay 230'. After the dial 102 restores to normal the relay 220 remains operated and relay 245 restores, resulting in relay 230' restoring shortly thereafter as relay 230' is a slow to release relay.

If the test connector 300 is idle battery will be encountered on contact 26 and this will result in the energization of the lower winding of relay 290, before relay 230' restores. The energization of the lower winding of relay 290 will close contact 297 resulting in the operation of relay 290 in full. Relay 230' then restores.

If the test connector 300 is busy battery is not encountered on the contact 26 and relay 290 will not operate. When relays 245 and 230' restore relay 280 will operate to connect tone from the BT lead to the telephone 101 to signal the test desk.

Assume now that connection with the test connector 300 was established when the test connector was idle, and results in the operation of relay 290. Relay 220 responding to the impulses of the next digit will cause ground pulses to be applied to the lead C33 causing the vertical magnet of the test connector to lift the wipers 301, 302 and 303 to the level corresponding to the dialed digit. Relay 280 is operated but has no function to perform at this time. When the dial restores to normal the relay 220 remains operated and relays 245 and 280 will restore. In the same manner as aforementioned relay 220 will cause the rotary magnet of the test connector 300 to move the wipers 301, 302 and 303 to the contacts corresponding to the dialed digit.

At the first closure of the rotary magnet circuit in the test connector 300, ground is connected to lead C34 which operates relay 265 which locks itself in multiple with relay 280, and which differentially energizes the two windings of relay 270. The relay 270 operates only the armature 273 when thus energized. After the dial restores to normal the relay 220 remains operated, and relay 245 restores, opening circuits to the relays 265 and 280. Relay 265 restores, and results in the windings of relay 270 being energized in series and relay 270 then operates in full. The closing of contact 272 results in the operation of relays 210 and 135. The closing of contact 273 results in the operation of relay 260. Relay 155 will not operate in series with resistor 256.

The operation of relay 260 results in the operation of relay 320. Ground on contact 316 is extended over multiple connections to similar bank contacts to make the line 305 busy, and the operation of the cut-off relay 320 clears the line 305 of attachments. The operation of relay 260 also results in the operation of relay 287, but its function will be explained hereinafter. As a result of the operation of relay 210 the windings of relay 220 are disconnected from conductors C14 and C15 and relays 220 and 135 are held operated and conductors C14 and C15 are connected to wipers 201 and 202 respectively.

The test desk is now connected directly to the line 305 and any of the regular testing operations may be performed. Should the tester desire to move the wipers of the test connector to the bank contacts of another line the dial is operated energizing the relays 130 and 140 in series. The operation of relays 130 and 140 result in the operation of relay 150, the restoration of relay 135 and the closing of an impulsing circuit to the upper winding of relay 220. The relay 220 follows the impulses and causes the operation of the test connector 300 as previously described. Relay 220 also causes the operation of relay 245 which in turn operates relay 280 which in turn connects relay 250 to the wiper 303 to provide for a busy test of the line to which the test connector 300 is next connected. After the dial restores to normal the relays 130 and 140 restore and the relays 135 and 220 are operated in series over a previously described circuit.

In case a line is busy, ground is encountered on a bank contact such as the bank contact 316. During impulsing the relays 245 and 280 are operated as previously described, and the ground on contact 316 is extended to relay 250 causing relay 250 to operate. Relay 250 will hold when relay 280 restores after pulsing. The relay 260 is energized in series with the resistor 256, and the relay 155 which will not operate, as previously described. The direct circuit from conductors C14 and C15 to wipers 201 and 202 is now opened at armatures 251 and 252. However, a circuit suitable for voice current is provided through condensers 223 and 224 and resistors 236 and 237. The resistor 256 is short circuited at armature 253 allowing the relay 155 to operate thus closing a circuit to the lamp 109 at armature 156. The lamp 109 indicates to the tester the busy condition of the line with which connection has been established. If the line to which connection has been established becomes free ground is disconnected from the wiper 303 and the relay 250 restores. The short circuit is removed from the resistor 256 thus causing the relay 155 to restore and extinguish the lamp 109. Ground through armatures 262 and 254 is extended to wiper 303 to make the line busy and the testing circuit is completed at armatures 251 and 252. It may be noted that the busy condition of a line to which a connection is established is extended to the test desk under control of the relay 250 and over the conductor C17.

After the tester has extended a connection over the test switch train to a line in the way described and has received an indication that the line tests busy, if no conversation is heard through the transmission circuit provided through condensers 223 and 224 he may wish to proceed with the usual line tests. The present invention provides an improved arrangement by means of which the tester can remove the busy condition of the line under test.

As is well known a permanent fault may result from the line conductor being accidentally bridged as shown at X, from one of the conductors being accidentally grounded as shown at Y, or from a combination of these two causes. It will be assumed in order to describe the invention that the line 305 has become bridged as shown at X and that the resistance of the bridge is low enough to operate either the relay 310 or the relay 340, and also assuming the normal situation shown as Z. With the relay 320 normal a circuit will have been closed for relay 310 which may be traced from battery through the winding of the relay 310, armature 321, upper conductor of line 305, bridge X, lower conductor of line 305, and armature 322 to ground. The relay 310 operates, grounding the contact 316 at armature 311 to make the line busy, connecting battery through the winding of the relay 320 and armature 312 to contact 325 to mark the line 305, and connecting ground through armature 313 to the distributor 370 to start a finder switch searching for the marked line.

Assume that the distributor has connected with the finder of the link 360 over a hunter switch 371 and that the finder will move its wipers 335, 336 and 337 until they engage the bank contacts 326, 324 and 325 respectively. Thereupon, as is well known, the movement of the wipers is halted, and switching relay 330 is operated by ground, connected for a brief interval to conductor C37. The operation of relay 330 results in the operation of relays 320 and 340. The operation of relay 340 results in the operation of relay 350. The operation of relay 320 causes relay 310 to restore. The operation of these relays maintains ground on contact 316.

It should be mentioned that certain known arrangements, for example the one shown in Lomax et al, 2,214,908 depart from the mode of operation just described in that the relay 340 is operated over a pre-energizing circuit (not shown) before the contacts 331 and 332 are closed. When this practice is followed the said pre-energizing circuit is opened after the line 305 has been switched through to relay 340 at contacts 331 and 332, so that relay 340 is held over the line loop as described. The operation of the relay 350 occurs before ground is removed from conductor C37, so that, upon such removal, relays 330 and 320 are held operated from ground at armature 351.

It will be appreciated that the operations described heretofore, which have taken place as a result of line 305 becoming bridged at X, are exactly the same as would have taken place if a call had been originated by removing the receiver at substation 304, and the same as would have taken place had the U or W condition existed instead of the normal Z condition. The apparatus will remain in the condition described as long as the bridge at X persists or until corrective measures are taken.

Considering now in detail the release of the switching equipment, assume now that the link 360 is held by the bridge X on the line 305 at the time the tester extends a connection to the line 305 by means of test distributor 200 and test conductor 300. The relay 250 is operated from ground on contact 316 and the relays 155 and 260 are operated in series over the conductor C17. The relays 245 and 280 restore after the impulses of the final digit have been received whereupon the relay 210 operates as previously described and a transmission circuit is completed through condensers 223 and 224. The tester is signalled by the lamp 109 and hearing no conversation decides that the line is held by a fault. In order to release the switching equipment held by the line 305 the tester operates the key 120 connecting ground through resistor 107, spring 121, conductor C13 spring 165, armature 136 and the windings of relays 140 and 130 to battery. Relay 140 does not operate when energized in series with resistor 107. Relay 130, however, operates and opens the circuit to the relay 150 at armature 131. The relay 150 restores and opens the circuit to the relays 155 and 260 at armature 152. The relay 260 restores, but relay 287 does not restore until shortly thereafter being a slow release relay. Assuming the Z condition, a circuit may now be traced from ground through armatures 262 and 209, the lower winding of relay 288, armatures 282 and 292, wiper 202, contact 22, conductor C32, wiper 302, contact 315, contact 324, wiper 336, and armature 332, through the lower winding of relay 340 to ground. The lower winding of relay 288 obviously will not be energized. Relay 287 will then restore. A circuit may now be traced from battery through armature 226, lower winding of relay 225, armature 227, resistor 249, armatures 261, 269, 251, 281 and 291, wiper 201, contact 21, conductor C31, wiper 301, contact 314, contact 326, wiper 325, armature 331, through the upper winding of relay 340 to battery. Another circuit may be traced from ground through armatures 262, 209, 279, 252, 282 and 292, wiper 202, contact 22, conductor C32, wiper 302, contact 315, contact 324, wiper 336, armature 332, through the lower winding of relay 340 to ground. The resistance of the lower winding of the relay 225 and the resistor 249 is very low and thus effectively the full voltage of the exchange battery is connected to both terminals of the upper winding of the relay 340 and direct ground is connected to both terminals of the lower winding of the relay 340. The relay 340 releases, as little if any current can flow through its windings, and the circuit to the relay 350 is opened at armature 341. The relay 350 restores and at armature 351 opens the holding circuits to the relays 330 and 320 and disconnects ground from contact 316, opening the circuit to the relay 250. The link 360 releases in well known manner and the windings of the relay 340 are disconnected from the line 305 at armatures 331 and 332 and at wipers 335 and 336. The relay 320 restores and connects the winding of the relay 310 to the line 305 at armature 321. The relay 310 is prevented from operating in series with the bridge "X" by the negative battery which is still connected through the wiper 301 to the upper conductor of the line 305.

Now assuming a W or U condition, a circuit may be traced from ground, armatures 262 and 209, the lower winding of relay 288, armatures 282 and 292, wiper 202, contact 22, conductor C32, wiper 302, contact 315, contact 326, wiper 335, armature 331, through the upper winding of relay 340 to battery. Relay 288 will operate, locking itself at armature 219. Relay 287 will then restore. A circuit may now be traced from battery, armature 226, the lower winding of relay 225, armature 227, resistor 249, armatures 261, 269, 252, 282, and 292, wiper 202, contact 22, conductor C32, wiper 302, contact 315, contact 326, wiper 335, armature 331, through the upper winding of relay 340 to battery. Another circuit may be traced from ground, armatures 262, 209, 279, 251, 281 and 291, wiper 201, contact 21, conductor C31, wiper 301, contact 314, contact 324, wiper 336, armature 332, through the lower winding of relay 340 to ground. With battery as now applied there will be a release of the exchange equipment in a similar manner as hereinbefore described for condition Z.

The relay 260 on restoring closed a circuit from ground through armatures 263, 276 and 255 and the lower winding of the relay 240 to battery. The relay 240 operates and, at armature 244, closes a multiple holding circuit to itself, and, at armature 241 prepares a circuit for the cut off relay 320. Shortly after ground has been removed from contact 316 by the restoration of the armature 351 the relay 250 restores. The relay 250 on releasing disconnects battery from the upper conductor of the line 305 at armature 251, disconnects ground from the lower conductor of the line 305 at armature 252, removes the short circuit from the resistor 256 at armature 253 and completes a circuit from ground through armatures 241 and 254, contacts 286, armature 296, wiper 205, contact 25, conductor C35, wiper 303, contact 316, armature 311 and the winding of the relay 320 to battery. The relay 320 operates and disconnects the winding of the relay 310 and ground from the line 305 at armatures 321 and 322.

Restoration of the key 120 opens the circuit to the relays 130 and 140. The relay 130 restores closing a circuit to the relay 150 at armature 131. The relay 150 operates and connects ground through armature 152, winding of relay 155, conductor C17, armature 273, resistor 256 and the winding of the relay 260 to battery. The relay 155 does not operate but the relay 260 operates, opening a circuit to the lower winding of the relay 240 at armature 263, and closing a multiple holding circuit to the relay 320 at armature 262. The relay 240 restores shortly after its circuit is opened at armature 263 disconnecting a multiple ground from the relay 320 at armature 241. Conductors C14 and C15 are now connected to the line 305 through armatures 251 and 252 and the usual line tests may now be made.

Assuming now that test distributor 1200, Figure 4, is substituted in place of test distributor 200. Parts of test distributor 1200 generally having the same function and operation as similar parts of test distributor 200 have the same number except for the addition of prefix number 1. Wherein the parts are different will now be described in detail. Assuming a busy condition of a line under test, such as hereinbefore described, wherein the tester desires to remove the busy condition, and assuming the condition Z, the tester operates key 120, causing relay 1260 to restore as hereinbefore described for relay 260. Slow release relay 1287 will restore shortly thereafter. A circuit may now be traced from battery through the upper winding of relay 340, armature 331, wiper 335, contact 326, contact 314, wiper 301, conductor C31, contact 121, wiper 1201, armatures 1291, 1281, 1261, 1209, 1219 and 1288', the lower winding of relay 1288 a relay polarized by the rectifier across its lower winding, armatures 1282 and 1292, wiper 1202, contact 122, conductor C32, wiper 302, contact 315, contact 324, wiper 336, armature 332, through the lower winding of relay 340 to ground. The polarized relay 1288 is so placed as not to operate under this normal battery condition, and it is to be understood that any well known type of polarized relay may be used here. Relay 1287 will then restore. A circuit may now be traced from battery, armature 1226, the lower winding of relay 1225, armature 1227, resistor 1249, armatures 1287', 1269, 1251, 1281 and 1291, wiper 1201, contact 121, conductor C31, wiper 301, contact 314, contact 326, wiper 335, armature 331, through the upper winding of relay 340 to battery. Another circuit may be traced from ground, armatures 1279, 1289, 1252, 1282 and 1292, wiper 1202, contact 122, conductor C32, wiper 302, contact 315, contact 324, wiper 336, armature 332, through the lower winding of relay 340 to ground. With battery thus applied to both terminals of the upper winding of relay 340 and ground connected to both terminals of the lower winding of relay 340 there is a release of the exchange equipment as hereinbefore described.

Now assuming the condition U or W in place of the normal condition Z. The tester operates key 120 causing relay 1260 to restore. A circuit may now be traced from battery, through the upper winding of relay 340, armature 331, wiper 335, contact 326, contact 315, wiper 303, conductor C32, contact 122, wiper 1202, armatures 1292 and 1282, through the lower winding of relay 1288, armatures 1288', 1219, 1289, 1261, 1281 and 1291, wiper 1201, contact 121, conductor C31, wiper 301, contact 314, contact 324, wiper 336, armature 332, through the lower winding of relay 340 to ground. The polarized relay 1288 will now have battery applied to the lower winding in the opposite direction from the direction applied during condition Z, and will therefore operate. Relay 1288 will lock itself operated over a circuit traced from battery, through the upper winding of relay 1288, armatures 1288'', 1287, and 1262, to ground. Relay 1287 will then restore. A circuit may now be traced from battery, armature 1226, through the lower winding of relay 1225, armature 1227, resistor 1249, armatures 1287', 1269, 1252, 1282 and 1292, wiper 1202, contact 122, conductor C32, wiper 302, contact 315, contact 326, wiper 335, armature 331, through the upper winding of relay 340 to battery. Another circuit may be traced from ground, armatures 1279, 1289, 1251, 1281 and 1291, wiper 1201, contact 121, conductor C31, wiper 301, contact 314, contact 324, wiper 336, armature 332, through the lower winding of relay 340, to ground. Thus the relay 340 will restore, and the exchange equipment will release as hereinbefore described, because of the battery applied to both terminals of one winding of relay 340, and the ground applied to both terminals of the other winding.

In case a direct ground has accidentally been connected to the upper conductor of the line 305 in the immediate vicinity of the switching equipment or in case an extremely low resistance bridge is connected across the line 305 the current flowing through the lower winding of the relay 225 or 1225 may reach a very high value without effecting the release of the relay 340. The relay 225 or 1225 can be adjusted to operate when the current flowing through its lower winding reaches a predetermined value, which for example might be two amperes. The relay 225 or 1225 operates armature 226 or 1226 first and connects battery through its center winding which in turn further operates the relay opening the armature 227 or 1227 and energizing the upper winding of the relay 225 or 1225. The upper winding of the relay 225 or 1225 is of relatively high resistance and will limit the current flow over the upper test conductor and through wiper 201 or 1201 to a safe amount, which may be only a few milliamperes.

Thus I have disclosed an improved arrangement for releasing switching equipment from a line under test. I have shown means whereby the line is tested before battery is applied to release the switching equipment, and means for correctly applying that battery. Having thus described my invention what I consider to be new and desire to have protected by Letters Patent will be set forth in the following claims.

What is claimed is:

1. In a telephone system, a plurality of lines, electrically powered switching equipment releasably connected to said lines, a source of power connected to each respective piece of said switching equipment in a normal or a reverse manner, test conductors, means for selectively connecting said conductors to any one of said lines, a relay connected to one test conductor, means for operating said relay only when the polarity of said power source connected to said switching equipment is reversed when said conductors are connected to selected one of said lines, a source of potential, means for reversing the polarity of said potential by the operation of said relay, and means independent of operation or non-operation of said relay for applying said source of potential to said selected line thereby releasing said switching equipment from said line.

2. In a telephone system, a plurality of lines, electrically powered switching equipment releasably connected to said lines, a source of power connected to each respective piece of said switching equipment in a normal or a reverse manner, test conductors, means for selectively connecting said conductors to any one of said lines, a polarized relay bridged across said test conductors, means for operating said relay only when the polarity of said power source of said switching equipment is reversed and when said conductors are connected to said lines, a source of potential, means for reversing the polarity of said potential by the operation of said relay, and means for connecting said source of potential to said selected line in a manner as determined by the operation or nonoperation of said relay thereby releasing said switching equipment from said lines.

3. In a telephone system, a plurality of lines, electrically powered switching equipment releasably connected to said lines, a source of power connected to each respective piece of said switching equipment in a normal or in a reverse manner, test conductors, means for selectively connecting said conductors to any one of said lines, a relay connected to one test conductor, means for operating said relay only when the polarity of said power source connected to said switching equipment, a source of potential associated with said relay, means including said relay for reversing the polarity of said potential when the polarity of said power source connected to said switching equipment is reversed, and relay means for applying said potential to said switching equipment to nullify the effect of said power source and cause the release of said switching equipment from said lines.

4. In a telephone system, a plurality of lines, electrically powered switching equipment releasably connected to said lines, a source of power connected to each respective piece of said switching equipment in a normal or a reverse manner, test conductors, means for selectively connecting said conductors to any one of said lines, a polarized relay bridge across said test conductors, means for operating said relay only when the polarity connected to said power source of said switching equipment is reversed and said conductors are connected to said lines, a source of potential associated with said relay, means including said relay for reversing the polarity of said potential when the polarity of said power source connected to said switching equipment is reversed, and relay means for applying said potential to said switching equipment to nullify the effect of said power source and cause the release of said switching equipment from said lines.

5. In a telephone system, lines, electrically powered switching equipment releasably connected to said lines, a source of power connected to said switching equipment, test conductors, means for selectively connecting said conductors to any of said lines, testing means connected to said test conductors including a test key for testing the polarity of said source of power when said conductors are connected to said lines, said testing means operated responsive to the operation of said test key, circuit means operated responsive to the operation of said testing means for connecting said source of power to said test conductors in the proper direction for releasing said switching equipment from said lines.

6. In a telephone system, a plurality of lines, electrically powered switching equipment releasably connected to said lines, a source of power connected to each respective piece of said switching equipment in a normal or a reverse manner, test conductors, means for selectively connecting said conductors to any one of said lines, relay means, a test key for connecting said relay means in series with said test conductors, means for operating said relay means only when the polarity of said power source connected to said switching equipment is reversed and said conductors are connected to said selected lines, a source of potential associated with said relay means, means including said relay means for reversing the polarity of said potential when the polarity of said power connected to said switching equipment is reversed, and a second relay means for applying said potential to said switching equipment to nullify the effect of said power source and cause the release of said switching equipment from said lines.

7. In a telephone system, a plurality of lines, electrically powered switching equipment releasably connected to said lines, a source of power connected to each respective piece of said switching equipment in a normal or a reverse manner, test conductors, means for selectively connecting said conductors to any one of said lines, relay means including a polarized relay, a test key for bridging said relay means across said test conductors, means for operating said relay means only when the polarity of said power source connected to said switching equipment is reversed and when said conductors are connected to the selected lines, a source of potential associated with said relay means, means including said relay means for reversing the polarity of said potential when the polarity of said power source connected to said switching equipment is reversed, and a second relay means for applying said potential to said switching equipment to nullify the effect of said power source and cause the release of said switching equipment from said lines.

8. In a telephone system, lines having switching devices which may be connected thereto by calls either to or from said lines, and having a source of potential which may be connected to a line in either of two directions by said devices, test equipment, means for selectively connecting said equipment to different ones of the lines to test for faults thereon, means in the equipment for first testing the line to determine the polarity of the potential connected thereto, and circuit means in the equipment for then applying a potential to the line in a direction automatically determined by the polarity of the potential already connected thereto, to thereby disconnect the devices from the tested line.

9. In a telephone system, a line to which switching device, having a source of potential of either polarity, may be connected, a test selector, test connectors having access to said line, means for operating a test selector to seize one of said test connectors and operate it to seize the line, means included in the test selector for automatically testing the line to determine the polarity of the potential connected to said switching device, means for connecting said source of potential to said test connector to release said switching device from said line when said test connector is connected to said line, and a relay for controlling the polarity of said source of potential connected to said test connector, said relay controlled by the means for testing the polarity of potential connected to said switching device.

10. In a telephone system, a line to which switching devices having a source of potential of different polarities may be connected, a test selector, test connectors having access to said line, means for operating a test selector to seize one of said test connectors and operate it to seize said line, and means in said test selector comprising two relays, one of said relays always operating to connect said source of potential to said test connectors to release said switching devices from said line, the other of said relays automatically testing the line to determine the polarity of the potential connected thereto, and to then control the polarity of the said source of potential connected to said test connectors by said other relay to release said switching devices from said line.

References Cited in the file of this patent

UNITED STATES PATENTS

| Number | Name | Date |
|---|---|---|
| 2,541,589 | Kessler | Feb. 13, 1951 |